(No Model.) 2 Sheets—Sheet 1.
G. W. PRESCOTT.
STEAM OFFSET FOR SAWMILL CARRIAGES.
No. 569,671. Patented Oct. 20, 1896.
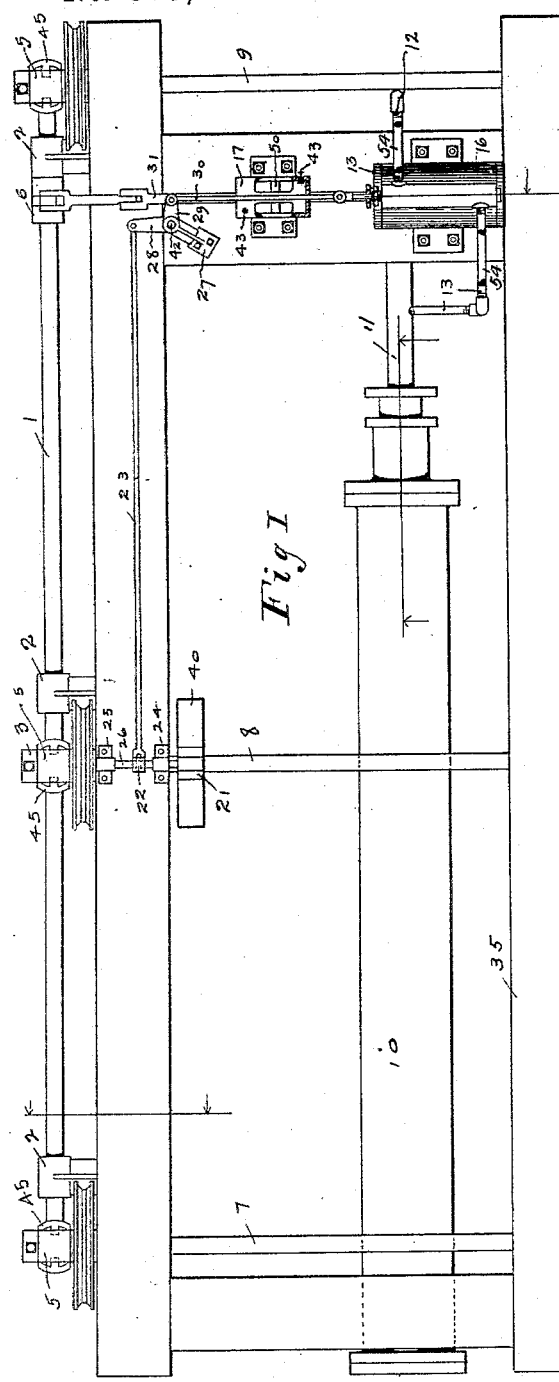
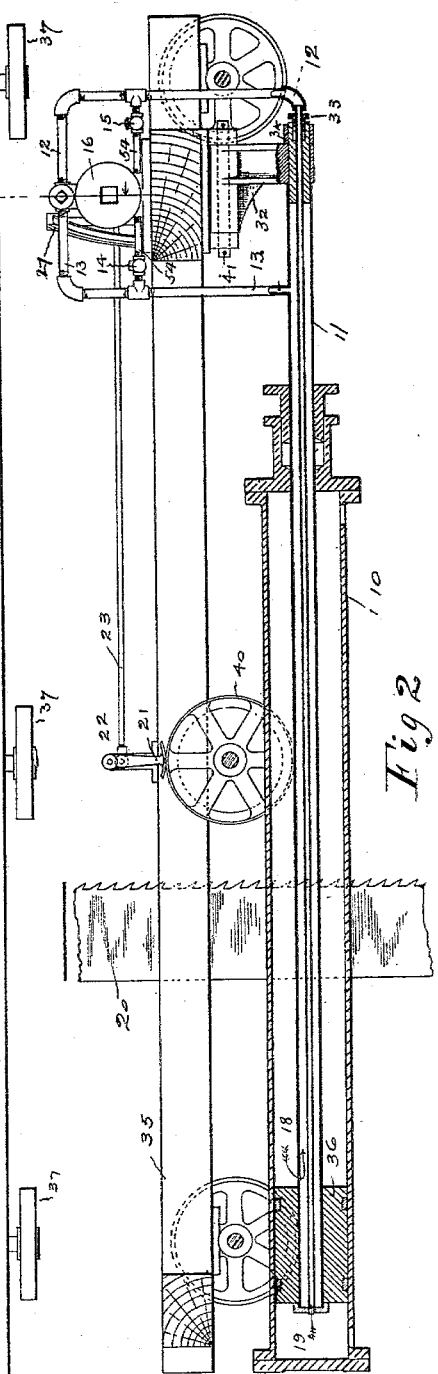
Witnesses
C. E. Cleveland
Wm Buselman
Inventor
George W. Prescott (No Model.) 2 Sheets—Sheet 2.

G. W. PRESCOTT.
STEAM OFFSET FOR SAWMILL CARRIAGES.

No. 569,671. Patented Oct. 20, 1896.

Witnesses
C. E. Cleveland
Wm Bufselman

Inventor
George W. Prescott.

United States Patent Office.

GEORGE WASHINGTON PRESCOTT, OF EAU CLAIRE, WISCONSIN.

STEAM-OFFSET FOR SAWMILL-CARRIAGES.

SPECIFICATION forming part of Letters Patent No. 569,671, dated October 20, 1896.

Application filed April 30, 1895. Serial No. 547,694. (No model.)

*To all whom it may concern:*

Be it known that I, GEORGE WASHINGTON PRESCOTT, a citizen of the United States, residing at Eau Claire, in the county of Eau Claire and State of Wisconsin, have invented certain new and useful Improvements in Steam-Offsets for Sawmill-Carriages; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to sawmills, and its object is to accomplish the offsetting of the carriage automatically and by fluid-pressure.

It is customary in sawmills to offset the carriage after passing the saw, that is, to move it laterally away from the saw in order that on its return the log may not rub the saw. As soon as the feed begins again the carriage is moved laterally toward the saw the same distance that it was previously withdrawn, so that there is no interference with the action of the set-works which regulate the thickness of the lumber.

Heretofore the offsetting has been effected by hand or by devices whose operation depended upon the friction of the carriage-axles.

My invention consists in certain appliances whereby I am able to use fluid-pressure, preferably steam, to automatically operate the offsetting mechanism. To describe it briefly, I will say that the laterally-movable carriage is connected with a rock-shaft running along one side of it, having a rock-arm connected with a fluid-pressure-actuated movable abutment on the carriage, such as a piston in a cylinder. When steam is admitted to the cylinder, the movement of the piston slides the carriage laterally on its axles one way or the other, the direction being automatically controlled by the valve-gear, which is actuated by a friction device whose direction of movement corresponds with that of the carriage. The steam is supplied to the cylinder from the carriage-feed cylinder by means of pipes connected with the hollow piston-rod which actuates the carriage.

Figure 4:
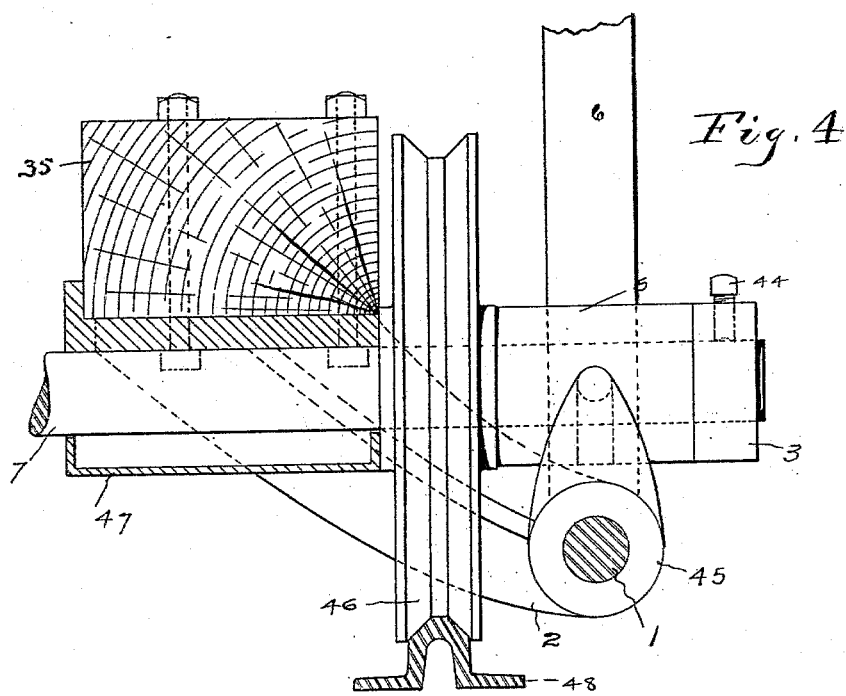
Figure 3:
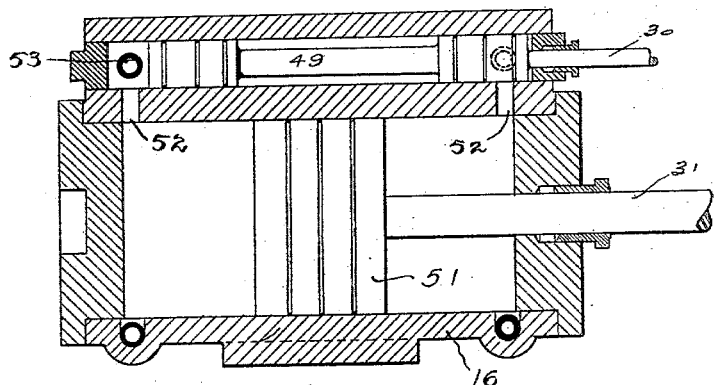

In the drawings, Figure 1 is a top plan view of a sawmill-carriage equipped with my invention. Fig. 2 is a sectional elevation. Fig. 3 is a longitudinal section of the cylinder and valve of the offsetting mechanism. Fig. 4 is a detail showing part of the carriage, the rock-shaft, and one of the carriage-wheels.

The frame 35 of the carriage is mounted upon transverse axles 7, 8, and 9 by means of boxes 47, which permit the carriage to slide sidewise on said axles. The axles have at one end flat wheels 37 and at the other end grooved wheels 46, running upon a rail 48. Adjacent to the wheels 46 a rock-shaft 1 runs along the side of the carriage, being journaled in brackets 2, fastened to the frame 35. A forked arm 45 is keyed to the rock-shaft opposite one or more of the wheels. The end of the arm is connected with the axle so as to be always at the same distance from the wheel. This is preferably accomplished by letting the axle project beyond the wheel to receive a sleeve 5, which is held from endwise movement by a collar 3, secured by a set-screw 44. The sleeve has a groove with which engage ears or lugs on the forked arm 45. An upright lever 6 is secured to the rock-shaft, and its upper end is connected with a rod 31, attached to a fluid-pressure-actuated abutment of any suitable kind mounted on the carriage. This is preferably a piston 51, contained in a cylinder 16.

By admitting steam to the cylinder first on one side of the piston and then on the other the carriage is caused to slide back and forth sidewise on its axles. To diminish the shock, a cushioning device is provided, consisting, preferably, of a piston 50 on the rod 31, which works in a cylinder 17, having openings cut a portion of its length, leaving its ends complete cylinders. Check-valves 43 in these portions permit a free inflow of air, but no outflow. When the piston 50 passes the ends of the openings, the air is confined in the end of the cylinder and brings the piston-rod to rest gradually, thus preventing any shock or jar to the parts.

The steam-chest of the cylinder 16 contains a valve 49, preferably a double-piston valve, provided with a valve-rod 30. This is connected with mechanism adapted to reverse the valve at each reversal of the movement of the carriage. Any suitable device for accomplishing this may be selected, but I prefer the one shown in the drawings, in which a friction-gear is the actuating element. In this arrangement of the valve-gear the rod 30 is connected with a rock-arm 29 on a vertical rock-shaft 42, journaled in brackets 27 on the carriage. The lower rock-arm 28 on the shaft 42 is connected by a rod 23 with a lever 22 on a short horizontal shaft 26, journaled in standards 24 25 adjacent to one of the axles, as 8. On this shaft is a lever-arm 21, having at its lower end a segment of a circular friction-gear in contact with a friction-wheel 40, keyed on the axle 8.

Steam-admission ports 52 are provided at each end of the steam-chest, each port being adjacent to a receiving-port 53, to which steam is conducted by pipes 12 and 13. The piston-valve 49 is arranged to close the two admission-ports alternately, at the same time closing the adjacent receiving-port.

The exhaust-ports 54 at the ends of the cylinder 16 are connected by short branch pipes with the pipes 12 and 13, respectively. In each branch is a check-valve 14 15, opening away from the cylinder 16.

The carriage-feeding cylinder 10 has a piston 36 and a hollow piston-rod 11, with which the pipe 13 is connected outside the cylinder 10. Near the piston there is a hole 18 in the piston-rod, so that steam can pass from the back end of the cylinder 10 to the left-hand end of the cylinder 16, as shown in Fig. 3. The pipe 12, communicating with the right-hand end of cylinder 16, is connected by a swivel-joint 33 with a pipe 19, running through the hollow piston-rod 11 to the front end of the piston 36. Steam can thus pass from the front end of the cylinder 10 to the right-hand end of the cylinder 16.

The piston-rod 11 is connected with the carriage by means of a hinged bracket 32, to allow for the lateral sliding of the carriage.

The operation of my invention is as follows: Suppose the cut to have been made by the band-saw 20 and the carriage to have arrived at the position shown in Fig. 2. To gig the carriage, steam is admitted to the cylinder 10 in front of the piston 36. The carriage moves to the right in Fig. 2. The wheel 40 rotates and carries the lever-arm 21 to the right, rocking the vertical shaft 42 and pushing the valve 49 to the left in Fig. 3, admitting steam from the pipes 19 12 into the right-hand end of the cylinder 16. The piston 51 then moves to the left, Fig. 3, pulling on the lever 6 and causing the carriage to slide up against the hubs of the grooved wheels 46, as shown in Figs. 1 and 4. This results from the fact that the wheels remain on the rail 48, and since the sleeves 5 and the ears of the rock-arms 45 are thus held in the same relative position with reference to the track a pull on the arm 6 will cause the rock-shaft and carriage to slide to the right, as in Fig. 4. When the gigging is finished and the feed commences, the steam from the back end of the cylinder 10 flows through the hollow piston-rod and pipe 13 to the left of the piston 51 in Fig. 3, reversing the movement of the rock-shaft and shoving the carriage over against the hubs of the wheels 37 in position to saw.

It will be seen that the steam exhausts from the cylinder 16 back through the cylinder 10, and the check-valves 14 15 therefore serve an important function, as follows: When the carriage is feeding or gigging at a rapid rate, the sawyer invariably reverses the steam just before the carriage reaches the end of its travel in order to stop it with a cushioning action. The check-valves prevent the steam thus admitted to the cylinder 10 from entering the cylinder 16 before the carriage begins its return movement. Otherwise the carriage would be offset before it had stopped, which would be disastrous.

Having thus described my invention, what I claim, and desire to secure by Letters Patent, is—

1. The combination with a sawmill-carriage, of an offsetting mechanism comprising a steam cylinder and piston, mounted on the carriage, an air-cylinder through which the piston-rod passes, and a piston on the rod inside of said cylinder, the air-cylinder having openings for a portion of its length, and inwardly-opening check-valves in its imperforate ends, substantially as described.

2. The combination with a sawmill-carriage, of an offsetting mechanism comprising an actuating steam cylinder and piston, a valve controlling the admission of steam to said cylinder, valve-operating mechanism and means for automatically reversing the same at each reversal of the movement of the carriage, substantially as described.

3. The combination with a sawmill-carriage, of an offsetting mechanism operated by a steam cylinder and piston, a steam-valve, and a friction-gear device for reversing said valve at each reversal of the carriage, substantially as described.

4. The combination with a sawmill-carriage, of an offsetting mechanism operated by a steam cylinder and piston, a steam-valve, valve-operating mechanism comprising a segmental friction-gear, and a friction gear-wheel meshing with the segment-gear and keyed on one of the carriage-axles, substantially as described.

5. The combination with a sawmill-carriage, of a steam-feed cylinder, an offsetting mechanism for the carriage provided with a steam-cylinder and valve-chest, and pipes connecting the ends of said valve-chest with the respective ends of the steam-feed cylinder, substantially as described.

6. The combination with a sawmill-carriage, of a steam-feed cylinder, provided with a hollow piston-rod, a pipe running through said rod, an offsetting mechanism for the carriage provided with a steam-cylinder for operating it, a pipe connecting one end of the offsetting cylinder with the hollow piston-rod, and a second pipe connecting the other end of said offsetting cylinder with the pipe running through the piston-rod, substantially as described.

7. The combination with a sawmill-carriage, of a steam-feed cylinder, a hollow piston-rod therefor communicating with the cylinder at one side of the piston, a pipe inside the piston-rod communicating with the cylinder at the other side of the piston, an offsetting mechanism for the carriage comprising a steam-cylinder, and valve-chest, a pipe connecting one end of said valve-chest with the hollow piston-rod, a second pipe connecting the other end of the valve-chest with the pipe inside the piston-rod, and a valve controlling the flow of steam from said pipes into the valve-chest, substantially as described.

8. The combination with a sawmill-carriage, having a steam-feed cylinder provided with a hollow piston-rod of an offsetting mechanism comprising a steam-cylinder and valve-chest, containing receiving and exhaust ports, separate pipes connected with the hollow piston-rod and supplying steam to the ends of the valve-chest, branch pipes connecting said steam-pipes with the exhaust-ports, and an outwardly-opening check-valve in each branch pipe, substantially as described.

9. The combination with a sawmill-carriage having a steam-feed cylinder, of an offsetting mechanism comprising a steam-cylinder and valve-chest, separate pipes connecting the ends of the offsetting cylinder with the corresponding ends of the feed-cylinder, branch pipes connecting said supply-pipes with the exhaust-ports of the offsetting cylinder, and outwardly-opening check-valves in said branch pipes, substantially as described.

In testimony whereof I affix my signature in presence of two witnesses.

GEORGE WASHINGTON PRESCOTT.

Witnesses:
JEROME S. GILLETT,
FRED B. DUBACH.